US010095862B2

United States Patent
Dore et al.

(10) Patent No.: US 10,095,862 B2
(45) Date of Patent: Oct. 9, 2018

(54) SYSTEM FOR EXECUTING CODE WITH BLIND HYPERVISION MECHANISM

(71) Applicant: COMMISSARIAT A L'ENERGIE ATOMIQUE ET AUX ENERGIES ALTERNATIVES, Paris (FR)

(72) Inventors: Philippe Dore, Montigny-le-Bretonneux (FR); Emmanuel Ohayon, Paris (FR); Renaud Sirdey, Cernay-la-Ville (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 254 days.

(21) Appl. No.: 15/124,642

(22) PCT Filed: Apr. 16, 2015

(86) PCT No.: PCT/EP2015/058263
§ 371 (c)(1),
(2) Date: Sep. 8, 2016

(87) PCT Pub. No.: WO2015/158821
PCT Pub. Date: Oct. 22, 2015

(65) Prior Publication Data
US 2017/0032119 A1 Feb. 2, 2017

(30) Foreign Application Priority Data
Apr. 16, 2014 (FR) ...................... 14 53420

(51) Int. Cl.
*G06F 21/53* (2013.01)
*G06F 21/57* (2013.01)
(Continued)

(52) U.S. Cl.
CPC .......... *G06F 21/53* (2013.01); *G06F 9/45558* (2013.01); *G06F 12/109* (2013.01);
(Continued)

(58) Field of Classification Search
CPC .......... G06F 21/50; G06F 21/52; G06F 21/53; G06F 21/57; G06F 21/575; G06F 21/604;
(Continued)

(56) References Cited

U.S. PATENT DOCUMENTS

2006/0161719 A1* 7/2006 Bennett ............... G06F 9/45533
711/6
2009/0063806 A1* 3/2009 Logan .................. G06F 9/5016
711/173

(Continued)

FOREIGN PATENT DOCUMENTS

EP 1 681 630 A1 7/2006
WO 2012/148324 A1 11/2012

OTHER PUBLICATIONS

D. Lie et al., "Architectural Support for Copy and Tamper Resistant Software," SIGPLAN Not., vol. 35, No. 11, pp. 168-177, Nov. 2000.
(Continued)

*Primary Examiner* — Eric W Shepperd
(74) *Attorney, Agent, or Firm* — Baker & Hostetler LLP (57) ABSTRACT

A system for executing code with blind hypervision mechanism comprises: at least one addressable physical memory, a processor operating in at least two modes, a mode termed initialization making it possible to define at least one partition in the memory and at least one second mode termed nominal, a memory bus linking the processor to the memory, a memory partitioning unit positioned on the memory bus, the unit being adapted for restricting memory access to the partition currently executing when the processor is in a mode other than the initialization mode.

6 Claims, 2 Drawing Sheets

(51) Int. Cl.
*G06F 12/109* (2016.01)
*G06F 9/455* (2018.01)
*G06F 13/16* (2006.01)
*H04L 9/08* (2006.01)
*H04L 9/32* (2006.01)

(52) U.S. Cl.
CPC .............. *G06F 13/16* (2013.01); *G06F 21/57* (2013.01); *H04L 9/0861* (2013.01); *H04L 9/3247* (2013.01); *G06F 2009/4557* (2013.01); *G06F 2009/45587* (2013.01)

(58) Field of Classification Search
CPC .......... G06F 21/70; G06F 21/74; G06F 12/14; G06F 12/109; G06F 9/455; G06F 9/45533; G06F 9/45558; G06F 9/45583; G06F 9/45587
See application file for complete search history.

(56) References Cited

U.S. PATENT DOCUMENTS

| | | | | |
|---|---|---|---|---|
| 2009/0157936 A1* | 6/2009 | Goss | ...................... | G06F 1/3203 710/264 |
| 2009/0307439 A1* | 12/2009 | Jacobs | ................ | G06F 11/0712 711/153 |
| 2010/0325454 A1* | 12/2010 | Parthasarathy | ........ | G06F 1/3203 713/320 |
| 2012/0084381 A1* | 4/2012 | Alladi | ..................... | G06F 9/544 709/213 |
| 2012/0084775 A1* | 4/2012 | Lotlikar | .............. | G06F 9/45558 718/1 |
| 2012/0096271 A1* | 4/2012 | Ramarathinam | ... | H04L 63/0807 713/172 |
| 2012/0110571 A1* | 5/2012 | Smith | ..................... | G06F 9/445 718/1 |
| 2012/0110572 A1* | 5/2012 | Kodi | ................... | G06F 9/45558 718/1 |
| 2012/0246641 A1* | 9/2012 | Gehrmann | ............. | G06F 9/445 718/1 |
| 2012/0278803 A1* | 11/2012 | Pavlov | ................ | G06F 9/45558 718/1 |
| 2015/0356029 A1* | 12/2015 | Craske | ................ | G06F 12/1441 711/163 |
| 2016/0156632 A1* | 6/2016 | Rohleder | ................ | G06F 21/60 726/27 |

OTHER PUBLICATIONS

G. E. Suh et al., "AEGIS: Architecture for Tamper-evident and Tamper-resistant Processing," Proceedings of the 17th Annual International Conference on Supercomputing, New York, NY, USA, 2003, pp. 160-171.

* cited by examiner

SYSTEM FOR EXECUTING CODE WITH BLIND HYPERVISION MECHANISM

CROSS-REFERENCE TO RELATED APPLICATIONS

This application is a National Stage of International patent application PCT/EP2015/058263, filed on Apr. 16, 2015, which claims priority to foreign French patent application No. FR 1453420, filed on Apr. 16, 2014, the disclosures of which are incorporated by reference in their entirety.

FIELD OF THE INVENTION

The invention relates to a system for executing code with blind hypervision mechanism and applies to the field of computer security.

BACKGROUND

There is a great deal of work, the oldest dating back about 15 years, pertaining to hardware architectures for security. Many approaches exist, with various security objectives. Most of them rely on a hardware aid in the form of a cryptographic coprocessor or a complete virtual processor guaranteeing its isolation from the remainder of the world, as in the case of the TrustZone technology from the company ARM™.

Another solution belonging to the prior art is the XOM (execute-Only Memory) hardware architecture described in particular in the article by D. Lie, C. Thekkath, M. Mitchell, P. Lincoln, D. Boneh, J. Mitchell, and M. Horowitz entitled "Architectural Support for Copy and Tamper Resistant Software," SIGPLAN Not., vol. 35, No. 11, pp. 168-177, November 2000. This technique offers guarantees of confidentiality by allowing blind execution of application package code, optionally including a complete virtual machine. The code and the data are stored in enciphered form in memory, and are enciphered/deciphered on the fly within the processor itself. Another existing solution is the AEGIS architecture described in the article by G. E. Suh, D. Clarke, B. Gassend, M. van Dijk, et S. Devadas entitled "AEGIS: Architecture for Tamper-evident and Tamper-resistant Processing," in Proceedings of the 17th Annual International Conference on Supercomputing, New York, N.Y., USA, 2003, pp. 160-171. This architecture relies on the same principles but considers an even more severe threat model.

However, the need exists to find an alternative to these solutions so as to obtain higher performance with lower hardware cost.

SUMMARY OF THE INVENTION

One of the aims of the invention is to remedy inadequacies/drawbacks of the prior art and/or to afford improvements thereto.

For this purpose the subjects of the invention are a system for executing code with blind hypervision mechanism, said system comprising:
  at least one addressable physical memory;
  a processor operating in at least two modes, a mode termed initialization making it possible to define at least one partition in the memory and at least one second mode termed nominal;
  a memory bus linking the processor to the memory;
  a memory partitioning unit positioned on the memory bus, said unit being adapted for restricting memory access to the partition currently executing when the processor is in a mode other than the initialization mode.

One of the fundamental advantages of the system according to the invention is that it does not make it necessary for the code and the data traveling over the memory bus to be enciphered/deciphered on the fly.

Another advantage is that the invention makes it possible to avoid the use of TCB (Trusted Computed Base) code to secure the hypervisor.

BRIEF DESCRIPTION OF THE DRAWINGS

Other characteristics and advantages of the invention will become apparent with the aid of the description which follows given by way of nonlimiting illustration, and with regard to the appended drawings, among which.

DETAILED DESCRIPTION

One of the objectives of the present invention is to guarantee the confidentiality and the integrity of the content of the memory used in a code execution platform when virtual machines are implemented. It is thus possible to guard against attacks of the privilege escalation type. Stated otherwise, malicious software that was to succeed in executing with the rights of the hypervisor by exploiting for example a security flaw is in practice unable to recover or modify codes and/or data of the virtualized machines on account of the implementation of the invention. This is guaranteed inter alia by adding hardware elements into the system.

With the implementation of the invention, only a physical attack implemented for example with the aid of a probe would make it possible to breach the security of the system. Thus, one of the decisive advantages of the invention is to be able to guarantee that the virtualization of machines does not introduce any additional vulnerability to those that might have been present initially in the virtualized machines.

Figure 1:
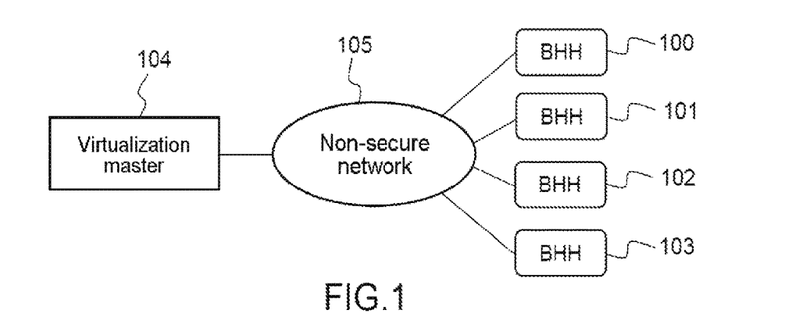
FIG. 1 gives an exemplary distributed system using blind virtualization.

FIG. 1 gives an exemplary system allowing blind virtualization.

One of the objectives of the invention is to guarantee the confidentiality and the integrity of the codes and data of one or more virtual machines executing on a virtualization platform.

The system according to the invention implements a suite of techniques making it possible to protect itself from threats that may be described with the aid of the following model:
  the threat is purely software;
  the purpose of the attack is to read or modify the codes and/or data of the partition of a virtual machine of the system;
  to this end, the attacker attempts to exploit a flaw of the virtualization system, by granting itself the rights of the hypervisor or by aiming to exploit malicious code present in the hypervisor;

the attack therefore originates a priori from a virtual machine executed by the system; however the present invention makes it possible generally to guard against an attack arising from malicious code executing in the hypervisor.

The virtualization architecture (FIG. 1) relies on a network consisting of host machines 100-103 or BHH (Blind Hypervision Host) tasked with executing virtual machines. It thus relies on one or more machines called Virtualization masters 104 having a role of leader and of authentication authority. The network 105 linking these machines is not considered to be safe.

The virtualization master 104 is responsible for load distribution (load balancing) between the various BHH host machines 100-103 and supervises the migration of virtual machines from one BHH machine 100-103 to another. It is also the master which sends for the first time a virtual machine to a BHH machine 100-103 when it is introduced into the system. Finally, the master acts as an authentication authority with the various BHH machines 100-103 so as to secure the exchanges of virtual machine images. It should be noted that the functions of the virtualization master can be fulfilled by a server machine of general-public type without requiring any particular hardware.

The BHH host machines 100-103 execute a hypervisor and receive from the network enciphered images of virtual machines to be executed. They can also receive migration orders from the virtualization master 104 and thus exchange images of virtual machines amongst themselves. The BHH machines require specific hardware components so as to implement blind hypervision. These components will be described in detail subsequently.

Each virtual machine is enciphered with the aid of its own symmetric key, chosen and kept by the virtualization master 104. The latter will therefore have to communicate the cipher key to a BHH machine 100-103 before it can execute the virtual machine, according to a key exchange protocol, an example of which is given further on in this description.

For authentication and cipher key exchange purposes, each BHH machine 100-103 has a unique pair of private/public cryptographic keys. The private key is stored in the BHH machine 100-103 for example in a read-only register, but is accessible by the processor only under certain conditions. In one embodiment, it can only be used by a component of the BHH machine 100-103 called a virtual machine loader (VM Loader) whose role is precisely to load the deciphered virtual machine into memory with a view to its execution. The virtual machine loader (VM Loader) is also capable of the inverse operation, that is to say of enciphering a memory image from one virtual machine so as to dispatch it through the network to another machine, on order of the virtualization master. The virtual machine loader (VM Loader) of a BHH machine 100-103 can be implemented in software and/or hardware form, for example in the form of trusted code stored in memory or implemented entirely by a DMA (Direct Memory Access).

The VM Monitor (or hypervisor) executes on the BHH machine in a hypervisor mode of the processor, which paradoxically gives it few rights. This runs counter to conventional processor architectures for which the hypervisor mode is traditionally the most permissive. Such a mode allows, in particular, complete access to the MPU (Memory Protection Unit)/MMU (Memory Management Unit) registers and to the inputs/outputs (I/Os).

Within the framework of the invention in particular, when the processor operates in hypervisor mode, it is impossible to read or to write in the memory space allocated to the virtual machines. Accordingly, a Memory Partitioning Unit is used. Access to a memory partition allocated to a given virtual machine is authorized only when this same virtual machine is executing. In one embodiment and when the processor is operating in hypervisor mode, access to the memory is also possible when the virtual machine loader (VM Loader) is executing.

The hypervisor for its part can execute its scheduling algorithms and provide its virtual machines with optional services without being able to access their memory, and without being able to grant itself any right of access on them. This isolation of the hypervisor is an essential aspect making it possible to guard against attacks of the privilege escalation type.

In the nominal operating mode, the memory is therefore partitioned into various areas, whose limits are frozen. These areas correspond to:

a partition dedicated to the hypervisor, the Memory Partitioning Unit MPU ensuring that this partition is the only one accessible when the processor is operating in hypervisor mode;

$N \geq 1$ partitions dedicated to the virtual machines, each being able to host a single machine, the Memory Partitioning Unit MPU ensuring that each of these partitions is accessible only in user or supervisor mode of the corresponding virtual machine, or by the virtual machine loader (VM Loader) during loading/unloading of the virtual machine;

in an optional manner, a read-only and non-modifiable partition for the code of the virtual machine loader (VM Loader).

In a preferred embodiment, the limits of these partitions are fixed when initializing the processor.

To summarize, the security properties of the system according to the invention rely on a suite of hardware and/or software mechanisms detailed hereinafter:

a Memory Partitioning Unit MPU ensuring, in hardware fashion, memory isolation between the various partitions;

a processor exhibiting various characteristics for security such as:
  four operating modes: Initialization, Hypervisor, Supervisor and User, with associated specific privileges;
  macro-instructions allowing the transition from one mode to another, optionally accompanied by a simultaneous change of partition in the Memory Partitioning Unit MPU;
  in particular, a specific macro-instruction making it possible to save the registers of the processor in memory before making it toggle into hypervisor mode (similar in spirit to the INT or SYSENTER instructions of Intel™ processors), while the Memory Partitioning Unit MPU simultaneously toggles to the partition dedicated to the hypervisor;

a virtual machine loader (VM Loader) can also be used to perform transfers:
  from the network interface to the memory with deciphering of the data on the fly;
  from the memory to the network interface with enciphering on the fly.

Figure 2:
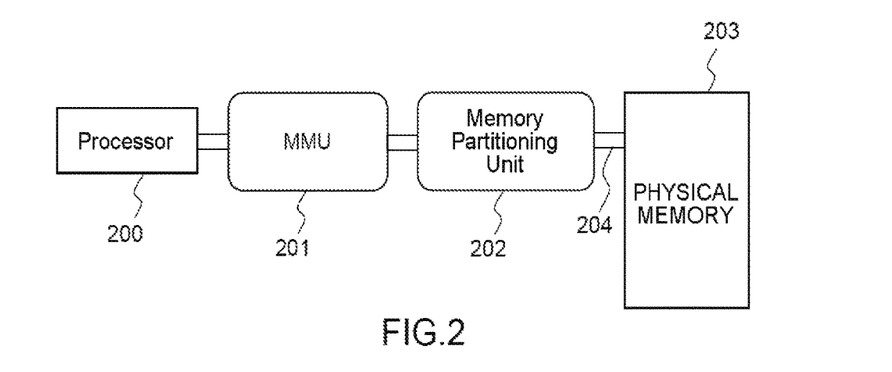
FIG. 2 gives an exemplary system for executing code according to the invention.

FIG. 2 gives an exemplary system for executing code according to the invention.

The system for executing code with a blind hypervision mechanism comprises:
  at least one addressable physical memory 203;
  a processor 200 operating in at least two modes, a mode termed initialization making it possible to define at least one partition in the memory and at least one second mode termed nominal;
  a memory bus 204 linking the processor to the memory;

a memory partitioning unit 202 positioned on the memory bus 204, said unit being adapted for restricting memory access to the partition currently executing when the processor 200 is in a mode other than the initialization mode; and a memory management unit 201.

According to an essential aspect of the invention, a dedicated hardware device ensures memory isolation between the various partitions. In contradistinction to a conventional MMU/MPU, this device can only be programmed when the processor is operating in Initialization mode. This means that neither the hypervisor nor a virtual machine will be able to read-access or write-access its registers and tables.

This device is adapted for making it possible to define the size and the number of partitions in memory as well as the optional communication channels between the virtual machines and the hypervisor. It is capable in particular of verifying that:

during nominal operation (that is to say outside of the Initialization mode), just one single partition is accessible: that of the hypervisor if the processor is executing in Hypervisor mode, or that of the virtual machine currently executing. The conventional additional access rights then apply solely to the partition in progress, while the other partitions are inaccessible;

the selection of the appropriate partition is done automatically when the processor switches from the hypervisor mode to a virtual machine or vice versa.

The partitions will have to be a priori disjoint and cover the entire memory of the system. Nonetheless, this device will be able to make it possible to define certain areas common to several partitions, such as for example for access to input/output registers on peripherals shared between several virtual machines, or else communication buffers between a virtual machine (VM) and the hypervisor.

The memory partitioning unit MPU can be added to a conventional protection/address translation mechanism (MPU/MMU) effective within the partition, and modifiable by the operating system of the partition (or the hypervisor in the case of the hypervisor partition).

In an alternative embodiment, an address translation unit is appended to the system. This unit defines only the partitions, upstream of a "conventional" MMU on the memory bus. This translation unit may be limited to a mechanism of segmentation type as on x86 [R11], that is to say make it possible to define memory segments by an offset and a size, each segment corresponding to a partition. FIG. 2 gives an illustration of this type of implementation. During nominal operation, when the processor executing a VM accesses a memory word, the latter sends on the bus a virtual address in the active partition. The MMU, generally configured by the operating system (OS) of the virtual machine (VM), transforms this virtual address into a real address within the partition. Next, the memory partitioning unit MPU converts this real address into a physical address of the host machine.

The memory partitioning unit MPU can be preconfigured in a static manner when designing the CPU or be as a minimum parametrizable in initialization mode:

size of the partition dedicated to the hypervisor;
size of the partitions that can accommodate a virtual machine (VM);
the number of partitions assigned to the virtual machines can be deduced from the above two parameters.

Extensions can be designed to allow the hypervisor to dynamically modify (outside of initialization mode) the size or the number of partitions, on condition that their codes and data always remain inaccessible to the hypervisor or to the other partitions.

In one embodiment, the processor can implement four execution levels:

initialization mode;
hypervisor mode;
VM-supervisor mode;
VM-user mode.

The hypervisor, VM-supervisor and VM-user modes are relatively similar to those encountered on the architectures affording a hardware aid to virtualization. They have in particular a decreasing priority in the sense of interrupts. For example in VM-supervisor mode, the processor can have its execution interrupted so as to toggle to hypervisor mode, either via an interrupt, or via a dedicated instruction.

Figure 3:
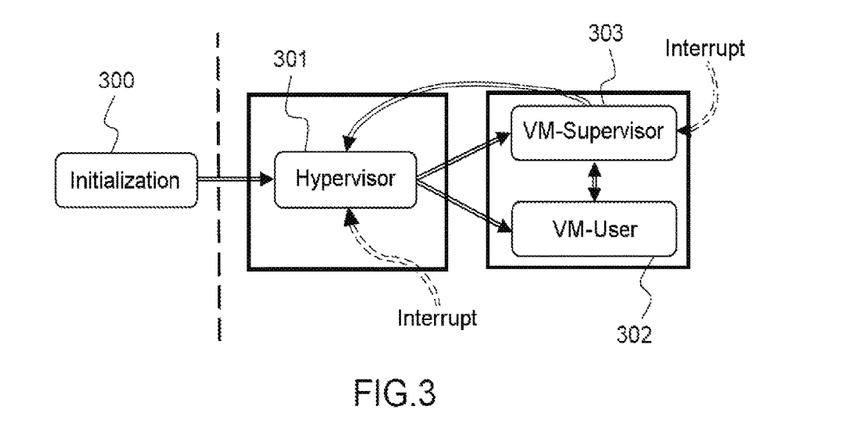
FIG. 3 schematically illustrates the various operating modes of a processor of the system for executing code according to the invention.

FIG. 3 schematically illustrates the various operating modes of a processor of the system for executing code according to the invention.

The initialization mode 300 is the default startup mode of the processor. It allows it read/write access to the entire content of the memory, as well as to the configuration registers of the memory partitioning unit, but the functionalities of the virtual machine loader (VM Loader) are not accessible to it. This mode exists so as to allow the initialization of the system and its input/output peripherals. It is possible to include, in the configuration of the system, the configuration of the partitioning of the memory. The processor can be used in a conventional manner while remaining in this mode. Nonetheless the functionalities related to secure virtualization will not be accessible.

After initialization, it is possible to toggle to the hypervisor mode by virtue of a dedicated instruction LAUNCHHV of the processor. This toggling activates the security mechanisms and is irreversible. The LAUNCHHV instruction, available solely in the Initialization mode carries out the following operations:

emptying and invalidation of the instruction cache memories of data;
resetting to zero of the processor context (general registers, state registers, etc.);
activation of the memory partitioning;
toggling of the memory partitioning unit so that the visible memory is that of the partition containing the hypervisor;
toggling of the processor to hypervisor mode;
loading of the instruction pointer at the choice of the chosen architecture options (the two options are not exclusive):

with the address immediately following the LAUNCHHV instruction (continuing the execution flow during the transition from initialization to hypervisor of the processor means that the platform initialization code resides in the memory area corresponding to the partition of the hypervisor and that the toggling does not affect the address translation for this partition);

with a fixed address in the partition of the hypervisor, corresponding to its entry point (The address of the hypervisor's entry point corresponding to its activation during the transition from initialization to hypervisor of the processor can be loaded in an indirect manner by reading it at a fixed and known address of its partition).

during this transition and as a function of the implementation chosen the partitions dedicated to the accommodating of virtual machines will be:

erased and marked as free;
and/or simply marked as free and not erased.

Under the second assumption, the call to the vmlNewContext( ) primitive will have to undertake the erasure of the selected partition.

It should be noted that the only means of returning to the Initialization mode after having executed the LAUNCHHV instruction, and thus of recovering the full capabilities on the machine is a reinitialization (RESET) of the processor, which will cause the registers and the memory to be reset to zero. This mechanism will make it possible to guarantee the confidentiality of the data loaded by the virtual machine loader (VM Loader) in memory.

The hypervisor mode 301 is the mode in which the hypervisor must execute. It is an entirely separate execution mode of the processor. According to the invention, direct read-access or write-access to the partitions of the virtual machines is impossible in this mode. The manipulation of these partitions is performed by way of the virtual machine loader (VM Loader), whose API is then accessible. Extensions can be envisaged to make it possible to redimension the memory partitions of the virtual machines from the hypervisor mode, always on condition that the latter can never access the memory.

From the hypervisor mode, it is possible to launch the execution of a virtual machine (VM) via a specific instruction LAUNCHVM, taking as parameter the identifier of the partition containing the virtual machine (VM) to be executed. In principle, this macro-instruction is similar to an "interrupt return" or "system call return" (e.g. SYSEXIT or IRET on x86 processors), insofar as it simultaneously makes it possible in particular to change memory context, to restore all of the state registers corresponding to the virtual machine (VM), and to toggle the processor into VM-Supervisor or VM-User mode, according to the state of the restored virtual machine (VM).

The VM-supervisor mode 303 corresponds to the traditional supervisor mode of any processor under hypervision. This is generally the execution mode used to execute the code of the kernel of the virtual machines. It ought to allow for example the operating system (OS) hosted by the virtual machine (VM) to execute favored instructions such as the masking of its interrupts, or the modification of its addressing space within its partition (MMU access). Nonetheless, it must remain impossible hardware-wise for the code executing at this level to access the partition of the hypervisor, or that of other virtual machines, by virtue of the memory partitioning unit.

The VM-User mode 302 corresponds to the traditional user mode of any processor. Together with the VM-supervisor mode, they constitute the two processor modes available for a virtual machine. Toggling between these two modes is not compulsory and comes within the responsibility of the system software and the virtual machine. These mode changes take place inside the partition of the virtual machine (VM) concerned and do not have any impact on security.

Initialization or reinitialization of the processor (RESET) is a tricky operation since it is the sole method allowing the processor to toggle to initialization mode. This simply means that the operations of partial RESET are proscribed. If the processor integrates software means for reinitializing the machine, they ought to comply with the following recommendations:

VM-User mode: this type of instruction is not available in this mode;

VM-Supervisor mode: such an instruction ought simply to restart the virtual machine by assigning the address of its entry point to the instruction pointer;

Hypervisor mode: the execution of such an instruction must behave in a manner identical to the assertion of the RESET pin of the processor, namely:
  erasure of the entire memory of RAM type;
  invalidation of the data cache and instruction cache;
  resetting to zero of the processor context (general registers, state registers, etc.);
  deactivation of all the memory protections and erasure of the MPU/MMU tables (including the configuration of the Memory Partitioning Unit);
  RESET of all the input/output devices;
  toggling of the processor to Initialization mode, thus rendering the virtual machine loader (VM Loader) inaccessible;
  loading of the instruction pointer with the address of the RESET vector.

Initialization Mode: the memory does not then hold any sensitive data as plaintext, so it is possible to undertake a "simplified" RESET, for example without resetting the content of the RAM to zero. The application of the same mechanisms as during a RESET from the Hypervisor mode is obviously sufficient.

No particular assumption is made about the VM Monitor (hypervisor): a priori this can be any hypervisor, on condition that it is modified so as to be able to submit to the memory protection imposed by the Memory Partitioning Unit. In particular, let us recall that the hypervisor does not have direct read-access or direct write-access to the memory of the virtual machines.

The possible needs of communication between the virtual machines and the hypervisor will be able to be ensured by shared isolated and dedicated memory channels, clearly identified in the memory partitioning unit during the Initialization phase.

The virtual machine loader (VM Loader) is a service called by the hypervisor, and whose role is to make data transfers to (respectively from) the memory partition of a VM with deciphering (respectively enciphering) on the fly. It should be recalled that these areas are read-inaccessible and write-inaccessible from the hypervisor mode.

The virtual machine loader (VM Loader) is the only entity having access to the private key of the BHH. It alone is therefore capable of authenticating itself with the virtualization master 104, and of receiving confidential data from it with the aid of this same key.

The virtual machine loader (VM Loader) can by choice be implemented hardware-wise, in the form of a DMA (Direct Memory Access) for example and/or in a software manner.

This device provides in hypervisor mode an API (Application Programming Interface), a basic example of which is described hereinafter.

Figure 4:
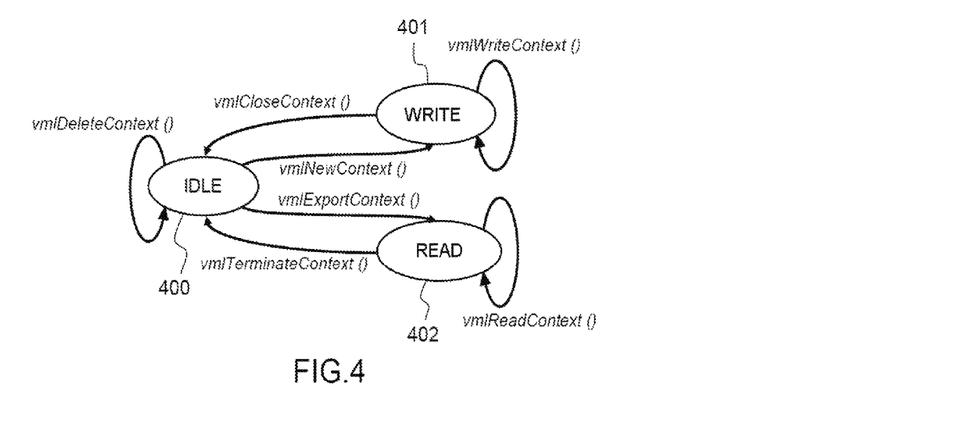
FIG. 4 gives an exemplary three-state automaton on which are depicted the possible operations that may be implemented on a partition via the virtual machine loader.

FIG. 4 gives an exemplary three-state automaton on which are depicted the possible operations that can be implemented on a partition via the virtual machine loader (VM Loader).

When the virtual machine loader (VM Loader) is in a state other than IDLE 400 for a given partition, the latter cannot be executed. This is the case in the write mode WRITE 401 and read mode READ 402. Otherwise, the execution of a LAUNCHVM instruction would raise an exception recovered by the hypervisor.

Examples of primitives are given hereinafter.
Example of Primitive: vmlNewContext( )
Syntax: vmlNewContext(cipherKey)
This primitive returns an identifier of a free memory partition into which a virtual machine (VM) can be loaded.

This partition is completely reset to zero by the virtual machine loader (VM Loader) during the call. The call fails if all the partitions are used.

The parameter cipherKey corresponds to the cipher key of the virtual machine (VM) which is getting ready to be loaded, itself enciphered with the aid of the public key of the virtual machine loader (VM Loader) (therefore typically indecipherable by the hypervisor). The virtual machine loader (VM Loader) deciphers and then loads this key into its own virtual machine (VM) key register, which is inaccessible to the remainder of the machine; it will be used for enciphering/deciphering this partition on the fly during the vmlWriteContext( ) and/or vmlReadContext( ) operations. It should be noted that there must be a VM key register per partition.

In an implementation where all of the partitions dedicated to the execution of a virtual machine (VM) are of identical size, this primitive does not require any additional parameter. It could however easily be generalized by accepting the desired partition size as input.

For performance purposes the state of the partitions (erased or not) could be stored in a register of the virtual machine loader (VM Loader) accessible solely to the latter.

Example of Primitive: vmlWriteContext( )

Syntax: vmlWriteContext(id, data, size)

This primitive deciphers and writes in the memory partition identified by id, the enciphered block of data data of size size. The memory partition identifier will have been obtained beforehand using the primitive vmlNewContext( ). The deciphering is done with the aid of the symmetric key which was passed during the call to vmlNewContext( ).

The behavior of this primitive is similar to the semantics of the write ( ) POSIX: each call to vmlWriteContext( ) writes adjacent blocks in the partition until it is full, in which case the call to this primitive fails.

Example of Primitive: vmlCloseContext( )

Syntax: vmlCloseContext(id, CRC)

This primitive signals the end of the writing of a partition, and undertakes a verification of the data written in the partition with an error detection code of CRC type. The verification is performed on the deciphered data.

The verification pertains to the entire partition thus making it possible to guard against replay (writing chunks of various virtual machines).

After the call to this primitive it becomes impossible to add any new data via a call to vmlWriteContext( ).

The partition will have to be freed by virtue of the primitive vmlDeleteContext( ).

Should verification fail, the primitive returns an error code. Henceforth:
- the erroneous virtual machine (VM) may not be executed;
- the partition may not be supplemented with other calls to the vmlWriteContext( );
- the primitive vmlCloseContext( ) may not be called again with a different CRC;
- the primitive vmlDeleteContext( ) will have to be used to free and erase the partition.

Example of Primitive: vmlExportContext( )

Syntax: vmlExportContext(id, destIdentity)

This primitive makes it possible to initiate a transfer of the virtual machine with a view to its migration.

The parameter destIdentity is provided by the virtualization master and indicates to the virtual machine loader (VM Loader) the BHH to which it must dispatch the image of the enciphered virtual machine (VM).

Example of Primitive: vmlReadContext( )

Syntax: vmlReadContext(id, data, size)

This primitive reads in the memory partition identified by id, the block chunk of data data of size size. This memory partition will have been loaded beforehand with the virtual machine targeted by the migration.

The behavior of this primitive is similar to the semantics of the read( ) POSIX: each call to vmlReadcontext( ) reads successively adjacent blocks in the partition, until it is read in its entirety, in which case the call to this primitive fails.

The data thus recovered of the partition are enciphered on the fly using the cipher key of the virtual machine (VM) obtained during the call to vmlNewContext( ) and stored up till then in a register internal to the virtual machine loader (VM Loader). The recipient virtual machine loader (VM Loader) will be able to decipher the image thus dispatched only if the virtualization master has previously also forwarded it the cipher key associated with the virtual machine (VM), via a call vmlNewContext( ).

Example of Primitive: vmlTerminateContext( )

Syntax: vmlTerminateContext(id, crc)

This primitive signals the end of the exportation of a partition, and undertakes the generation and the sending of the integrity verification code of CRC type. This code pertains to the entirety of the deciphered data contained in the data partition.

After the call to this primitive, the memory of the partition is completely erased and will again be able to be allocated, in a manner similar to a call vmlDeleteContext( ).

Example of Primitive: vmlDeleteContext( )

Syntax: vmlDeleteContext(id)

This primitive frees the partition identified by id. The content of the associated memory is completely erased.

This partition will be able, subsequently, to be reallocated by the hypervisor with the aid of the primitive vmlNewContext( ).

The virtual machine loader (VM Loader) can be implemented in software form, on condition that its code and its data are protected from any interaction with the other partitions (including the hypervisor). In order to avoid any injection of malicious code, the virtual machine loader (VM Loader) can be loaded into memory using techniques of SecureBoot type of the UEFI (Unified Extensible Firmware Interface Forum) to guarantee its authenticity.

Moreover, the virtual machine loader (VM Loader) will have to execute in an inherent partition, which will afford it access to the partitions of the virtual machines that it loads or unloads. It should be noted that this partition can take several forms: memory area that is reserved and protected in the nominal operating mode of the processor, secure virtual machine of "TrustZone" or other type.

The call to functions of the API of the virtual machine loader (VM Loader) can still only be made by the processor operating in hypervisor mode; moreover, a call to one of these functions will have to temporarily deactivate the memory partitioning unit MPU so as to allow access to the other partitions by the virtual machine loader (VM Loader).

Processor mechanisms that can be implemented to ensure the toggling between the hypervisor mode and any virtual machine (VM) are described here.

Toggling to a Virtual Machine (VM)

The processor can have a dedicated instruction LAUNCHVM which takes in argument the identifier of the virtual machine (VM) to execute, such as returned by the call vmlNewContext( ). This instruction is available solely in hypervisor mode, and returns an error if it is executed on a partition which has not been validated by a call to vmlCloseContext( ).

The instruction LAUNCHVM carries out the following operations:
- emptying and invalidation of the instruction and data caches;
- resetting to zero of the processor context (general registers, state registers, etc.);
- toggling of the Memory Partitioning Unit so that the visible memory is that of the partition containing the virtual machine (VM);
- toggling of the processor to VM-Supervisor mode;
- loading of the instruction pointer with a fixed address inside the active partition corresponding to the context restoration routine. The address of the context restoration routine can be loaded in an indirect manner by reading the latter at a fixed and known address of the active partition.

The code of the context restoration routine is provided by the hypervisor and must be included by the virtual machine at the specified address. Its role is to restore the processor context of the previously preempted virtual machine.

It should be noted that the alteration of this code by the virtual machine will have no impact on the remainder of the system and will in no case compromise the confidentiality of the data of said virtual machine (VM). Furthermore, the data of the other virtual machines and of the hypervisor which are present on the host machine will not be compromised in any way. On the other hand, the VM whose restoration code has been altered may under any assumption no longer operate correctly, or indeed no longer operate at all; but such an attack of "service denial" type corresponds to a flaw inherent in the virtual machine (VM) itself, against which we do not purport to guard ourselves through the present invention.

Virtual Machine (VM) which Gives Way

A virtual machine (VM) can give way by choice via a dedicated instruction YIELD (corresponding to what is customarily called a "hypercall"), or when a non-maskable interrupt occurs signaling the expiry of a timer programmed by the hypervisor.

These two situations lead to the same behavior:
- execution in VM-Supervisor mode of a context saving procedure (registers, state of the machine, etc.) which is "hard-wired", or at the very least stored in an unalterable manner in the system;
- emptying and invalidation of the instruction and data caches;
- resetting to zero of the processor context (general registers, state registers, etc.);
- configuration of the MPU so that the visible memory is that of the partition containing the hypervisor;
- toggling of the processor to hypervisor mode;
- loading of the instruction pointer with a fixed address inside the partition hosting the hypervisor corresponding to a dedicated entry point of the latter. The address of the entry point dedicated to the return in the hypervisor can be loaded in an indirect manner by reading the latter at a fixed and known address of the partition intended for it.

It should be noted that the code of the context saving routine may not reside within the virtual machine (VM) itself. It would then be impossible to guarantee that this routine does indeed terminate with a toggling to the hypervisor; henceforth, an attack of denial of service type affecting the whole system (and therefore the other virtual machines executing on it) could easily be carried out. Consequently, the routine for saving the context of the virtual machine (VM) will have to be ensured either by microcode, or by code stored in an unalterable area of the processor, or by any other mechanism internal to the processor guaranteeing its unalterability.

Exchanges of the Virtual Machines with the Outside

Essentially considered are Inputs/Outputs (I/Os) corresponding to network traffic passing through one or more shared interfaces; but the principles extend to all other types of I/Os, such as writes to a disk that is shared among several virtual machines.

Many hypervisor implementations require that the virtual machines pass through the hypervisor for their I/O operations, in particular on architectures that do not benefit from hardware tools for the virtualization of peripherals (IOMMU). The assumption is made here that for any outbound communication, the security of the data (in particular confidentiality, authenticity) must be guaranteed by the virtual machine in the higher layers of the protocol implemented, whatever it may be. This does not of itself constitute an additional security flaw due to virtualization, insofar as a compromised hypervisor spying on the I/Os of a virtual machine (VM) would have the same nuisance capability as any node of the communication network through which the I/O in question travels.

Noting that this precaution is necessary even if the virtual machine (VM) is authorized within the framework of its partition to address physical input/output peripherals directly, provided that the latter are shared with the hypervisor and/or other virtual machines.

Virtual Machine (VM) Loading and Migration

The introduction of a new virtual machine into the system is done by the virtualization master. The latter associates with each new virtual machine (VM) a single cipher key, which will be used for the transit of the virtual machine (VM) through the network. The virtualization master therefore maintains:
- a list of the public keys of the BHHs of the network;
- a list of the (symmetric) cipher keys associated with each virtual machine (VM) executed in the system;
- when the virtualization master chooses to dispatch the image of a virtual machine (VM) to a BHH for execution, it initially dispatches to it the cipher key of the virtual machine (VM), itself enciphered with the aid of the public key of the BHH, so that only the virtual machine loader (VM Loader) is able to read it, through a call vmlNewContext( ). This is followed by the image of the virtual machine (VM) itself, enciphered with the cipher key transmitted.

Figure 5:
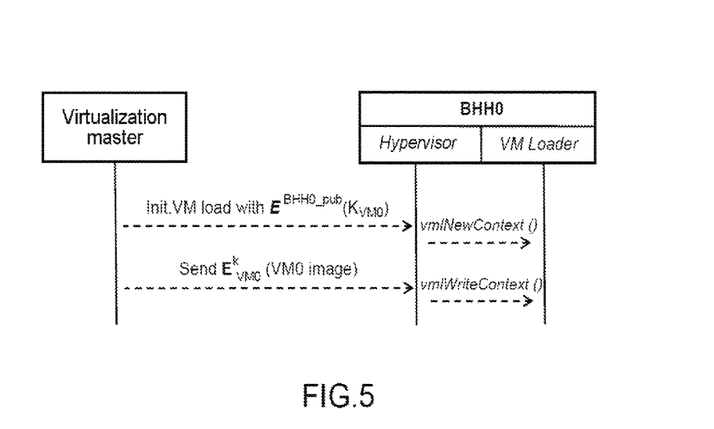
FIG. 5 illustrates an exemplary loading protocol, between the virtualization master and a blind hypervision host (BHH).

FIG. 5 illustrates an exemplary loading protocol, between the virtualization master and a BHH.

The function E is any enciphering function; the expression $E^K(X)$ corresponds to the cipher of X using the key K. BHH0_pub is the public key of the virtual machine loader (VM Loader) of BHH0, and $K_{VM0}$ is the symmetric cipher key associated with the VM0. It is noted that no plaintext data passes between the hands of the hypervisor of the BHH0: all the decipherings are done by the virtual machine loader (VM Loader), in areas that are inaccessible to the hypervisor.

The virtual machine (VM) migration from a BHH0 to a BHH1 follows a similar protocol: the virtualization master dispatches to BHH1 the cipher key $K_{VM0}$ (itself enciphered with the public key BHH1_pub) of the virtual machine (VM) that it must get ready to receive, and then dispatches the order to the sender BHH (BHH0) to initiate the migration. The latter dispatches to BHH1 the virtual machine (VM) enciphered by using the key $K_{VM0}$, kept up till then in a virtual machine (VM) key register of the virtual machine loader (VM Loader).

It should be noted that the protocols described here are partial and given solely by way of example; they can be extended (with the functionalities of the virtual machine loader (VM Loader) in particular to strengthen the authentication of the BHHs by the virtualization master, to ensure for example that a malicious machine does not attempt to make a BHH of the network execute "false" virtual machines.

It is important to note that the invention can be applied in different contexts than that of virtualization.

Digital signal processors DSPs or, generally, specialized processors (used for example as accelerators) present in the "onboard" world do not necessarily employ very advanced MPU/MMU devices. For a given application, they efficiently carry out intensive calculation operations such as radio signal, image or sound processing.

The coexistence of several virtual machines as well as their migration are not requirements for these types of processors. Nonetheless it may be beneficial to offer this type of CPU a blind loading mechanism so as to guarantee the confidentiality of the loaded application package. This possibility supplements techniques of Secure Boot type which guarantee the authenticity of the loaded application package.

Only a subset of the mechanisms described in this document will then be required:
  the primitives vmlExportContext( ), vmlReadContext( ) and vmlTerminateContext( ) are not necessary;
  two partitions are necessary (one for the loader and one for the application);
  three processor modes are sufficient (Initialization, Loader and Application package; only the transitions Initialization→Loader, Loader→Application package are authorized, assuming that once in nominal mode the application package no longer needs to execute the code of the loader again. It could even be envisaged to authorize the Application package partition to recover the memory space of the Loader partition. It is possible for the number of processor modes for a DSP to be reduced to two if the size of the two partitions is fixed during its design, for this mechanism to be active on startup and for the application to carry out the initialization of the platform.

A typical use would consist in:
  starting the processor in Initialization mode, initializing the machine (peripherals, I/O) and preparing the partitions, by loading in particular the bootloader into the memory area corresponding to the Loader partition;
  executing the transition Initialization→Loader, thus activating the Memory Partitioning Unit and toggling the processor to the Loader partition;
  executing the code of the loader, which relies on the virtual machine Loader (VM Loader) to load the code of the application package into its partition—the loader therefore cannot read the code of the application package which is loaded into memory;
  executing the transition Loader→Application package, so as to launch the application package. The machine will remain in the Application package partition until RESET.

The functionalities of the BHH can be implemented in a pseudo-distributed manner, for example over a chip of many-core type where several clusters are linked by an NoC (Network-on-Chip).

In such a configuration, each partition can be delineated by a node of the network, implementing de facHto a certain isolation level since each cluster has its own memory. As previously, the virtual machine loader (VM Loader) can be implemented by safety code on the cluster of the hypervisor, and/or by dedicated hardware of DMA type, capable in both cases of writing to the memory of any cluster/partition so as to load thereinto the deciphered image of a virtual machine (VM). Note that if the virtual machine loader (VM Loader) relies on the NoC, the latter must be considered trusted since images of virtual machines will be able a priori to travel therein as plaintext. Stated otherwise, it is necessary to guarantee (for example hardware-wise) that the other clusters of the chip cannot spy on the data traveling therein.

In this architecture, the changes of mode from/to Hypervisor are no longer warranted since a cluster is entirely dedicated to the hypervision; nonetheless it will have to be possible for the non-hypervisor partitions to be interrupted by the hypervisor partition for the migrations/loading of virtual machines.

Note finally that this principle can be generalized to an implementation distributed between several physical machines linked by a private sub-network; once again, this can be envisaged under the assumption that the nodes of the sub-network are not able to spy on the frames traveling over it ("plaintext" images arising from the virtual machine loader).

The invention claimed is:

1. A system for executing code with a blind hypervision mechanism, said system comprising:
  at least one addressable physical memory;
  a processor operating in at least two modes including an initialization mode making possible to define at least one partition in the memory and at least one nominal mode;
  a memory bus linking the processor to the memory;
  a memory partitioning unit positioned on the memory bus, said unit being adapted for restricting memory access to the partition currently executing when the processor is in a mode other than the initialization mode;
  a memory partition allocated to a hypervisor and at least one memory partition allocated to at least one virtual machine (VM);
  a virtual machine loader making possible to load into memory a virtual machine with a view to execution of the virtual machine;
  in which the processor comprises a hypervisor mode, during which, access to the physical memory is only possible when the virtual machine loader is executed;
  a memory management unit (MMU) and a memory protection unit (MPU) being positioned between the processor and the memory partitioning unit.

2. The system as claimed in claim 1, wherein an instruction set of the processor is adapted in such a way that a switch to the initialization mode is not possible once the nominal mode has been activated, other than resetting the processor.

3. The system as claimed in claim 1, wherein said virtual machine is enciphered and has been transmitted by a telecommunications network, said virtual machine loader comprises a digital key allowing said virtual machine loader to decipher the virtual machine.

4. The system as claimed in claim 3, wherein the virtual machine loader is implemented in hardware form with the aid of a silicon module, the digital key being etched into the silicon module.

5. The system as claimed in claim 1, wherein the physical memory is partitioned into a plurality of areas when the processor is in the nominal mode, the areas corresponding to:

a partition dedicated to a hypervisor, the memory partitioning unit ensuring that the partition is the only partition accessible when the processor is operating in the hypervisor mode; and $N \geq 1$ partitions dedicated respectively to N virtual machines, each of the $N \geq 1$ partitions being able to host a single machine, wherein the MPU ensures that each of the $N \geq 1$ partitions is accessible only in a user mode or a supervisor mode of the corresponding virtual machine, or by the virtual machine loader during loading/unloading of the corresponding virtual machine.

6. The system as claimed in claim 5, wherein the physical memory comprises a non-modifiable read-only partition for the code of a virtual machine loader.

* * * * *